United States Patent Office 2,970,996
Patented Feb. 7, 1961

2,970,996

PURIFICATION OF NITROCELLULOSE

Charles Earnest Silk, Alton, Ill., assignor to Olin Mathieson Chemical Corporation, a corporation of Virginia No Drawing. Filed Sept. 19, 1951, Ser. No. 247,357

10 Claims. (Cl. 260—223)

This invention relates to the treatment of nitrocellulose and more particularly to the purification thereof.

The nitration of cellulose results in the desired product, nitrocellulose, mixed together and contaminated with nitric acid, sulphuric acid, nitrocelluloses of lower nitrogen content, and other impurities. These bodies deleteriously influence the stability of the nitrated cellulose and must, therefore, be removed before the desired stability of the nitrocellulose can be obtained. In the past, nitrocellulose has been purified by laborious and time consuming methods. The most commonly used method for the purification of freshly nitrated cellulose involves boiling the nitrocellulose in wooden tubs for a period of forty hours with a minimum of four complete changes of water, pulping or beating to remove the last traces of acidity occluded by the fibers, and then a poaching operation which involves another boiling treatment in an alkaline solution such as sodium carbonate. After treatment with the alkaline solution, it is necessary to repeat the water boiling operation another four times in order to insure the obtainment of a product having acceptable stability characteristics. Subsequent to the wide acceptance of the above process, Olsen in his patent, U.S. 1,893,677, taught that this process could be somewhat shortened by subjecting the nitrocellulose to a short water boil at atmospheric pressure and then washing the nitrocellulose with a solution containing an organic amine such as urea, diphenylamine and the like. More recently, a process for the purification of nitrocellulose, which completely eliminates the boiling and soaking steps, has been perfected. This process is described in U.S. Patent 2,175,212 to Olsen, Tibbetts and Kerone and involves forming an aqueous slurry of acidulated nitrocellulose, softening the nitrocellulose with a solvent and washing it in a mildly alkaline bath. This process is exceptionally well adapted to the purification of deteriorated nitrocellulose containing regions of acid concentration such as are encountered when old powder is ground for reworking; and provides an excellent means for the preparation of stable nitrocellulose when the nitrocellulose to be purified is completely dissolved to form a lacquer for the preparation of spherical grains of powder as described in U.S. Patent 2,027,114. However, when this process is applied to freshly nitrated uncolloided nitrocellulose, it has been found that it results in the production of some colloided nitrocellulose, which is highly objectionable when completely uncolloided nitrocellulose is desired.

The present invention has as an object the provision of a simplified and improved process of stabilizing and purifying nitrocellulose whereby the above and other disadvantages of prior art processes are overcome. It is also an object of this invention to provide a novel process for the purification of nitrocellulose. It is also an object of this invention to provide a rapid and economical process for the stabilization of freshly nitrated cellulose. Another and a more specific object of this invention is the provision of a process to facilitate the purification and stabilization of uncolloided nitrocellulose.

In accordance with this invention, these, and other objects and advantages which will become apparent from the following detailed description are accomplished, generally speaking, by treating impure or unstable nitrocellulose with an aqueous emulsion of a water-immiscible volatile nitrocellulose solvent. For purposes of this invention, a volatile solvent is defined as a solvent more volatile than water. The solvent is not present in such amounts as to dissolve or gelatinize the nitrocellulose but only in sufficient quantity to swell the nitrocellulose or render it more permeable. Although any suitable method may be employed to effect intermixing of the nitrocellulose and the solvent emulsion, this intermixing is realized with the greatest facility by forming a suspension of nitrocellulose in an aqueous medium and adding thereto the aqueous emulsion of the nitrocellulose solvent. If the nitrocellulose is strongly acidic, as in the case of freshly nitrated cellulose, it is preferable to include a mild alkali in the emulsion. Any suitable relatively water-insoluble alkali such as calcium carbonate, etc., or water-soluble alkali such as the soluble carbonates and bicarbonates of the alkali metals, i.e. sodium bicarbonate, sodium carbonate, potassium carbonate, etc., as well as organic amines such as urea and the like as described by Olsen in U.S. Patent 1,893,677 may be used. Such alkaline agents may be used singly or in any desired combination; and it is only necessary that they be present in sufficeint quantity to neutralize any acid or acid-forming bodies present in the nitrocellulose being treated. The pH of the mixture is preferably maintained between about 7.5 and 10. If desired, the process of this invention may be expedited by using finely divided nitrocellulose which may be obtained, for example, by subjecting freshly nitrated cellulose to the beating action of a hammer mill. In accordance with this invention, the stabilization and purification of nitrocellulose may be accomplished if the treatment of the nitrocellulose with the emulsion is at room temperature but the operation is greatly facilitated at an elevated temperature above the boiling point of the solvent and below the boiling point of water in a closed container. The pressure is thus above atmospheric pressure and facilitates the purification reaction. For instance, it has been determined that freshly nitrated cellulose may be purified and stabilized by thus heating the nitrocellulose in the presence of the solvent for about two hours in a closed container. Further heating may be advantageous when it is desired to reduce the viscosity rating of the nitrocellulose being treated. In such cases the heating is prolonged until a product having the desired viscosity characteristics is produced.

Swelling of the nitrocellulose fibers as practiced by this invention permits the aqueous washing medium to penetrate to the innermost parts of the nitrocellulose in suspension with no permanent change in the physical structure of the nitrocellulose. When solvent was added as described in the aforementioned patent, U.S. 2,175,212, in an amount sufficient to dissolve or partially dissolve the nitrocellulose, purification was effected; but when the amount of solvent is so small as to only swell or render the nitrocellulose more permeable as required in accordance with the present invention, difficulty is sometimes encountered because the addition of the solvent to the nitrocellulose suspended in water results in the local gelatinization or solution of some of the nitrocellulose; whereas, other portions of the nitrocellulose are not properly softened due to the fact that the solvent is not evenly distributed throughout the suspension and additional solvent further aggravates the situation by causing further and more complete gelatinization of the nitrocellulose.

Such local gelatinization of a portion of the nitrocellulose being treated and unequal distribution of the solvent throughout the nitrocellulose slurry are obviated in accordance with the present process by adding the nitrocellulose solvent in the form of an aqueous emulsion to the nitrocellulose in suspension. The ease of distribution of the solvent throughout the bath is roughly proportional to the degree of fineness of the emulsion. Thus, in order to obtain the best results it is preferred that the emulsion be made using conventional equipment, technique and emulsifying agents, and then passed through a colloid mill to make it practically homogeneous. In any event the particle size of the dispersed phase should be sufficiently small as to form a substantially stable emulsion. The amount of solvent used is preferably greater than about 0.2 part per part by weight of nitrocellulose in order to effect an increased permeability of the nitrocellulose. Care must be exercised in practicing the process of this invention so that the nitrocellulose solvent is not present in sufficient quantity to cause solution, sticking together, or any permanent change in the structure of any of the nitrocellulose under treatment. In the case where ethyl acetate is used as the solvent it has been found, for example, that not more than about two parts of ethyl acetate for each part of nitrocellulose must be used. When other solvents such as methyl acetate, isopropyl acetate, methyl isobutyl ketone, and the like are used, an amount insufficient to dissolve or cause sticking together of the nitrocellulose should likewise be used.

In each instance the solvent is preferably added in amounts greater than can be dissolved in the water present; or if desired the water used may be saturated with the solvent prior to the formation of the nitrocellulose solvent. As an example, water saturated with ethyl acetate will contain approximately 8% of the solvent at 20° C. and approximately 6.7% at 55° C. The ratios of water to nitrocellulose in the aqueous nitrocellulose suspension may vary within wide limits, which are determined primarily by the type of nitrocellulose being treated and economic considerations. It has been found, however, that suspensions having ratios between 8:1 and 16:1 serve best to accomplish the purposes of this invention.

These various features of the invention will become more apparent and be readily understood by those skilled in the art when the following illustrative embodiment of the invention is read. Unless otherwise specified, all proportions of the various reagents in this embodiment are based on the weight of the nitrocellulose.

*Example 1*

Freshly nitrated cellulose was separated from the spent acid mechanically, drowned in an excess of water and then passed through a hammer mill to break down the fibers. Thirty parts of this sour nitrocellulose was slurried with about 400 parts of water containing 0.3 part of calcium carbonate in a vessel provided with suitable agitating and sealing means. The agitators were put into operation and kept in operation for the remainder of the process. This slurry was heated to 50° C. and an emulsion of ethyl acetate and water added to the vessel. This emulsion consisted of 60 parts of ethyl acetate emulsified with an equal quantity of water. Prior to the addition of this emulsion, 1% diphenylamine based on the weight of the nitrocellulose was dissolved in the ethyl acetate and the ethyl acetate emulsified with the water using 0.03% Turkey red oil as the emulsifying agent. This emulsion was passed through a colloid mill to obtain a finely divided homogeneous emulsion of ethyl acetate in water, and added to the vessel containing the nitrocellulose slurry. After agitating the contents of the vessel for approximately ½ hour at 50° C. the vessel was closed and heated to a temperature of about 90° C. for approximately 1 hour. During this heating period, the pressure within the vessel raised from about 12 to 14 pounds per square inch above atmospheric pressure. The contents of the vessel were then cooled to about 60° C., the vessel opened to a suitable solvent recovery system, and the temperature elevated to about 90° C. in order to drive off the ethyl acetate. This process resulted in a fibrous nitrocellulose having greatly improved stability characteristics.

*Example 2*

This process was substantially repeated on another sample of the beaten nitrocellulose used in Example 1, but the ratio of ethyl acetate to nitrocellulose was reduced from 2:1 to 1:1.

*Example 3*

A third sample of the nitrocellulose as used in Example 1 was subjected to the same purification process, but the ratio of solvent to nitrocellulose was further reduced to ½:1.

*Example 4*

Another portion of the nitrocellulose as used above was purified in accordance with the process of Example 2 using the same solvent to nitrocellulose ratio of 1:1. In this case, however, the process was abbreviated by eliminating the step of treating the nitrocellulose with the vessel closed for one hour at 90° C. Thus, after the nitrocellulose slurry was agitated with the solvent emulsion for ½ hour at 50° C., the temperature of the mixture in the open vessel was elevated to 90° C. to remove the ethyl acetate.

In order to determine the efficacy of beating the nitrocellulose prior to the purification process of this invention, the series of four experiments described in the above examples was repeated using a comparable grade of fibrous nitrocellulose that had not been beaten. By this group of tests, it was clearly established that the process works equally well with beaten and unbeaten nitrocellulose. The unbeaten stabilized nitrocellulose thus purified is identified in the table given hereinafter as Examples 5, 6, 7, and 8 which correspond in all aspects of the purification process with Examples 1, 2, 3, and 4 respectively.

Samples of the nitrocellulose purified as described in the above examples were dried and their stability determined by subjecting them to the standard German stability test. In this test a sample of the nitrocellulose being tested was placed in a test tube and a piece of methyl violet indicator paper positioned approximately one inch above the sample in the tube. The tube containing the samples were then placed in a constant temperature bath at a temperature of 134.5° C. for five hours, and the following observations made: (1) time in which the methyl violet paper turned to a salmon pink color, (2) time of appearance of red nitric oxide fumes, and (3) time in which the sample exploded. The results obtained are given in the following table, in which the time is recorded in minutes. By way of comparison the test was also conducted on a sample of untreated nitrocellulose.

| Example | Salmon Pink | Red Fumes | Explosion |
|---|---|---|---|
| Untreated nitrocellulose | 10 | 10 | 25 |
| 1 | 40 | 60 | 300+ |
| 2 | 25 | 30 | 300+ |
| 3 | 30 | 35 | 300+ |
| 4 | 35 | 50 | 300+ |
| 5 | 35 | 60 | 300+ |
| 6 | 35 | 70 | 300+ |
| 7 | 35 | 55 | 300+ |
| 8 | 35 | 65 | 300+ |

The various examples and stability values given above show explicitly that this invention accomplishes its objects by providing a novel, rapid and economical process for the purification and stabilization of nitrocellulose that obviates the disadvantages of the prior art processes.

From the foregoing description it is apparent that many modifications of the process hereinbefore described will present themselves to those skilled in the art without departing from the spirit of the invention as set forth in the appended claims.

Having thus described the invention, what is claimed is:

1. A method of treating freshly nitrated uncolloided nitrocellulose comprising intermixing an aqueous emulsion of a volatile nitrocellulose solvent and said nitrocelluose, heating the mixture at a temperature less than the boiling point of water, and thereafter removing the solvent from the uncolloided nitrocellulose.

2. A method of treating unstable uncolloided nitrocellulose comprising intermixing an aqueous emulsion of a volatile nitrocellulose solvent and said nitrocellulose, swelling said nitrocellulose by heating the mixture at a temperature less than the boiling point of water, and thereafter removing the solvent from the uncolloided nitrocellulose.

3. A method of treating unstable uncolloided nitrocellulose comprising intermixing an aqueous emulsion of a volatile nitrocellulose solvent and a mildly alkaline aqueous suspension of said nitrocellulose, swelling said nitrocellulose by hetaing the mixture at a temperature less than the boiling point of water, and thereafter removing the solvent from the uncolloided nitrocellulose while in said suspension.

4. A method of purifying unstable fibrous nitrocellulose comprising forming a mildly alkaline aqueous suspension of said nitrocellulose, mixing therewith an aqueous emulsion of a volatile nitrocellulose solvent, swelling said nitrocellulose by heating said mixture at a temperature less than the boiling point of water, and thereafter removing the solvent from the fibrous nitrocellulose while in said suspension.

5. A method of purifying unstable fibrous nitrocellulose comprising forming a mildly alkaline aqueous suspension of said nitrocellulose, mixing therewith an aqueous emulsion of a volatile nitrocellulose solvent, swelling said nitrocellulose at a temperature between the boiling points of said solvent and water, and thereafter removing the solvent from the fibrous nitrocellulose while in said suspension.

6. A method of purifying unstable fibrous nitrocellulose comprising forming an aqueous suspension of said nitrocellulose, mixing therewith an aqueous emulsion of a volatile nitrocellulose solvent, and swelling said nitrocellulose at a temperature between the boiling points of said solvent and water for about two hours in a closed container and thereafter removing the solvent from the fibrous nitrocellulose while in said suspension.

7. A method of purifying unstable fibrous nitrocellulose comprising forming a mildly alkaline aqueous suspension of said nitrocellulose, mixing therewith an aqueous emulsion of a volatile nitrocellulose solvent, and swelling said nitrocellulose at a temperature between the boiling points of said solvent and water for about two hours in a closed container.

8. A method of purifying unstable fibrous nitrocellulose comprising swelling said nitrocellulose by adding a volatile nitrocellulose solvent emulsified in water to a water suspension of said nitrocellulose and thereafter removing the solvent from the fibrous nitrocellulose while in said suspension.

9. A method of purifying fibrous nitrocellulose comprising forming a mildly alkaline aqueous suspension of said nitrocellulose, mixing therewith an aqueous emulsion of ethyl acetate, swelling said nitrocellulose at a temperature between the respective boiling points of said solvent and water for about two hours in a closed container, and thereafter removing the ethyl acetate from the fibrous nitrocellulose while in suspension.

10. A method of purifying uncolloided nitrocellulose comprising forming an aqueous suspension of said nitrocellulose, adding thereto ethyl acetate emulsified in water, said ethyl acetate being present in ratios between about 0.2 part and about 2.0 parts by weight per part by weight of nitrocellulose, heating the resultant mixture at a temperature between the boiling point of ethyl acetate and water in a closed container, and thereafter removing the ethyl acetate from the uncolloided nitrocellulose while in suspension by heating said mixture at atmospheric pressure and at a temperature between the boiling point of ethyl acetate and water.

References Cited in the file of this patent

UNITED STATES PATENTS

| | | |
|---|---|---|
| 1,893,677 | Olsen | Jan. 10, 1933 |
| 2,114,491 | Hollabaugh | Apr. 19, 1938 |
| 2,175,212 | Olsen et al. | Oct. 10, 1939 |